Jan 6, 1931.                I. F. BLIER                1,787,469
                      AUTOMATIC ROASTING APPARATUS
                         Filed April 6, 1929
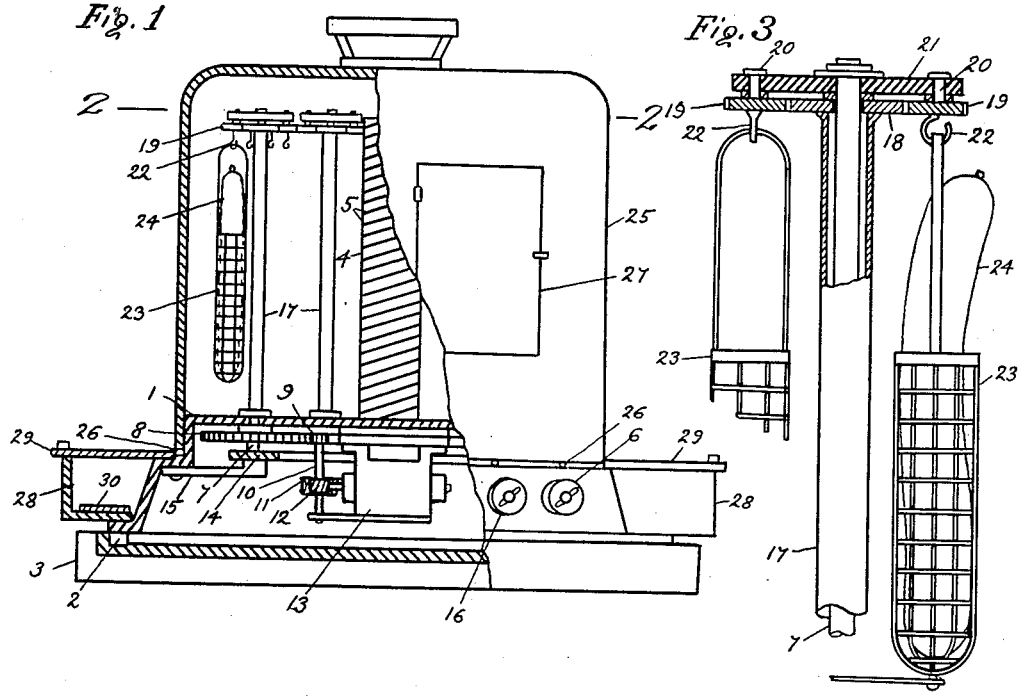
Isaac F. Blier
INVENTOR
BY John P. Nironow
ATTORNEY Patented Jan. 6, 1931

1,787,469

UNITED STATES PATENT OFFICE

ISAAC F. BLIER, OF NEW YORK, N. Y.

AUTOMATIC ROASTING APPARATUS

Application filed April 6, 1929. Serial No. 353,117.

My invention relates to automatic roasting apparatus and has a particular reference to devices for roasting sausages and similar articles of food.

The object of my invention is to provide a device in which sausages or similar articles of food are automatically turned around in front of a source of heat in order to uniformly roast them from all sides and to maintain them in a heated condition, ready for use.

My invention is more fully described in the accompanying specification and drawing in which—

Fig. 1 is an elevation partly in section, Fig. 2 is a section taken on the line 2—2 (Fig. 1), Fig. 3 is a partial enlarged view of the sausage holders, and Fig. 4 is a top view of same.

My roasting device consists of a base 1 in the form of an inverted cup. It is mounted with its edges on rollers 2 placed in a groove in a bottom plate 3. The upper portion of the base 1 is flat and in its center a post 4 is mounted made of a refractory insulating material, such as porcelain or glass. A heating wire 5 is wound on this post, the ends of this wire being connected through a switch 6 with a source of electric current.

Concentrically with the heating post 4 are located vertical posts 7 rotatively mounted in the upper board of the base 1. These posts are provided underneath the board of the base 1 with gears 8 in mesh with each other and in mesh with a pinion 9 on a vertical shaft 10 with a worm gear 11 in mesh with a worm 12 on the end of the shaft of an electric motor 13 bolted underneath to the top board of the base 1. The lower ends of the posts 7 rest on a ring plate 14 supported by brackets 15 from the sides of the base 1. A switch 16 controls the electric circuit for the motor.

The posts 7 rotate inside of stationary tubes 17 attached to the upper surface of the base 1.

Gears 18 are attached to the upper ends of the tubes 17 and are in mesh with satellite pinions 19 with central shafts 20 rotatively mounted in upper plates 21 attached to the upper ends of the shafts or posts 7 with which they rotate. Hooks 22 are attached to the pinions 19 from which wire cages 23 are suspended. The cages are open in their upper portions for insertion of sausages 24 (of the variety commonly known as "wieners") or similar articles of food. The bottom portions of the cages 23 are pivotally supported in a light frame 24 to prevent their swinging during operation of the device.

A cover 25 is placed over the device and rests on rollers 26 so that it can be easily turned around in order to bring the door 27 opposite any desired post 7. The cover may be made of any suitable material such as metal. It can be also made of glass if it is desired to see the operation of the mechanism.

Pockets 28 are supported on the sides of the base 1 and are provided with covers 29. Heaters 30 are placed inside of the pockets and are operated from the same circuit as the central heater 4, or they may be connected to a separate circuit. These pockets are intended for such food as sauerkraut which may be required with sausages.

Important advantages of my device are that it is entirely automatic in its operation, can uniformly roast a more or less large number of sausages or similar articles of food, simple and convenient in its operation, and is attractive and interesting in its appearance.

The operation of my device is as follows:

The sausages are placed in the cages 23 through the door 27, turning the base 1 around on the bottom plate 3 so as to bring successively all the cages in front to the operator, turning the cover 25 at the same time in order to have the door 27 in front. The heat is then turned on by the switch 6 and the motor started by turning the switch 16. The shafts 7, turning in the tubes 17, will rotate the cages 23, bringing one after another near the heater 4, rotating at the same time each cage so as to have the sausages roasted uniformly on all sides.

The operation is continued until all the sausages are properly cooked and then they are either removed or the heat turned off to prevent their being roasted too much.

I claim as my invention:

1. In an automatic roasting apparatus, the combination with a base, of a heating member on said base, a plurality of stationary tubes supported on said base, gears on top of said tubes, shafts rotatively supported in said tubes, discs on top of said shafts, pinions rotatively supported in said discs, said pinions being in mesh with said gears, means to support articles to be roasted on said pinions, and means to rotate said shafts with said pinions.

2. In an automatic roasting apparatus, the combination with a base, of a heating member on said base, a plurality of stationary tubes supported on said base, gears on top of said tubes, shafts rotatively supported in said tubes, discs on top of said shafts, pinions rotatively supported in said discs and in mesh with said gears, gears connected with the lower ends of said shafts and in mesh with each other, and a motor in said base adapted to rotate said gears.

In testimony whereof I affix my signature.

ISAAC F. BLIER.